US010931351B2

(12) United States Patent
Kangas et al.

(10) Patent No.: US 10,931,351 B2
(45) Date of Patent: Feb. 23, 2021

(54) METHODS AND DEVICES FOR HANDLING TRANSMISSIONS WITH NON-ORTHOGONALTY LOSSES

(71) Applicant: Telefonaktiebolaget LM Ericsson (publ), Stockholm (SE)

(72) Inventors: Ari Kangas, Lidingö (SE); Björn Nordström, Hässelby (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/620,946

(22) PCT Filed: Jul. 26, 2017

(86) PCT No.: PCT/SE2017/050796
§ 371 (c)(1),
(2) Date: Dec. 10, 2019

(87) PCT Pub. No.: WO2019/022654
PCT Pub. Date: Jan. 31, 2019

(65) Prior Publication Data
US 2020/0119791 A1 Apr. 16, 2020

(51) Int. Cl.
H04B 7/06 (2006.01)
H04B 17/336 (2015.01)
(Continued)

(52) U.S. Cl.
CPC ......... H04B 7/0617 (2013.01); H04B 7/0417 (2013.01); H04B 7/0456 (2013.01);
(Continued)

(58) Field of Classification Search
CPC .. H04B 7/0417; H04B 7/0456; H04B 7/0617; H04B 17/336; H04L 1/0013; H04L 5/0048; H04L 5/0053; H04W 72/042
See application file for complete search history.

(56) References Cited

U.S. PATENT DOCUMENTS

2003/0048800 A1* 3/2003 Kilfoyle ............... H04W 52/12
370/441
2005/0041693 A1 2/2005 Priotti
(Continued)

FOREIGN PATENT DOCUMENTS

WO 2015161040 A1 10/2015
WO 2017074520 A1 5/2017

OTHER PUBLICATIONS

International Search Report and Written Opinion for International Patent Application No. PCT/SE2017/050796, dated Mar. 26, 2018, 11 pages.

Primary Examiner — Siu M Lee
(74) Attorney, Agent, or Firm — Withrow & Terranova, PLLC

(57) ABSTRACT

Disclosed is a method and corresponding devices and computer programs for determining antenna weights for transmissions with punctured signals. The method comprises extracting, from a signal reception model for signals transmitted by at least two communication units, at least one of the communication units transmitting with punctured signals, a signal orthogonality loss quantity introduced by the punctured signals. The method also comprises calculating, based on the extracted signal orthogonality loss quantity, a covariance matrix quantifying the signal orthogonality loss between signals transmitted by the at least two communication units. The method also comprises determining, based on the covariance matrix, antenna weights for data symbols in the signals. Also disclosed is a method and corresponding
(Continued)

devices and computer programs for designing a beamformer based on the determined antenna weights, wherein the beamformer suppresses the interference caused by a signal orthogonality loss induced by the transmission of punctured signals.

17 Claims, 11 Drawing Sheets

(51) Int. Cl.
*H04B 7/0417* (2017.01)
*H04B 7/0456* (2017.01)
*H04L 1/00* (2006.01)
*H04L 5/00* (2006.01)
*H04W 72/04* (2009.01)

(52) U.S. Cl.
CPC ......... *H04B 17/336* (2015.01); *H04L 1/0013* (2013.01); *H04L 5/0048* (2013.01); *H04L 5/0053* (2013.01); *H04W 72/042* (2013.01)

(56) References Cited

U.S. PATENT DOCUMENTS

2017/0331577 A1* 11/2017 Parkvall ............... H04B 7/0848
2017/0331670 A1* 11/2017 Parkvall ............... H04J 11/0079

* cited by examiner

METHODS AND DEVICES FOR HANDLING TRANSMISSIONS WITH NON-ORTHOGONALTY LOSSES

This application is a 35 U.S.C. § 371 national phase filing of International Application No. PCT/SE2017/050796, filed Jul. 26, 2017, the disclosure of which is incorporated herein by reference in its entirety.

TECHNICAL FIELD

The proposed technology generally relates to methods and systems for determining antenna weights for transmissions with punctured signals. More specifically it relates to methods and systems for determining antenna weights and corresponding beamformers that accounts for, and suppresses, interferences introduced by non-orthogonality amongst transmitted punctured signals. Also disclosed are computer programs for determining antenna weights for punctured signals and designing beamformers based on determined antenna weights.

BACKGROUND

The Physical Uplink Control Channel, PUCCH, is a physical channel in LTE used to transmit uplink control information, UCI, from a UE to an eNB. The information could be HARQ acknowledgements/negative acknowledgements, ACK/NACK, or Scheduling Request, SR, Information. In addition, Channel Quality information can be transmitted on PUCCH. This present disclosure will however mainly relate to reception of signals carrying information such as PUCCH ACK/NACK and SR.

In order to briefly describe the generation of a PUCCH signal note that the duration of a PUCCH signal is one subframe, e.g. 1 ms. This subframe can be further divided into 2 slots. The PUCCH signal occupies one physical resource block, PRB, pair meaning that the signal bandwidth is 180 kHz. Within each slot, 6 or 7 OFDM symbols are transmitted, depending on the size of the cyclic prefix, CP. Four of the symbols in each slot contain data symbols which include the modulated information bit, which e.g. may be either ACK/NACK or SR. The remaining symbols are reference symbols used for channel estimation. For each data symbol, the modulated information is multiplied with a length-12 sequence and mapped onto 12 frequency subcarriers, followed by multiplication with a scrambling sequence, which is one complex-valued scalar value per slot, and an orthogonal cover value for the symbol. The resulting frequency domain signal is transformed to the time domain using an IFFT and a cyclic prefix is added.

Multiple users can be multiplexed on the same resource block. 12 different orthogonal cyclic shifts are defined which means that 12 UEs can use the PRB. In addition, orthogonal covers, OC, are used so that 3 users can share the same cyclic shift, meaning that in total 36 UEs can share a PRB.

The orthogonal covers are listed in Table 1 below. It can be verified that the sequences are orthogonal, ie that ($p_i$, denotes the number of user equipments, UEs):

$$\sum_{i=0}^{3} W_{oc,p1}(i) \cdot W_{oc,p2}(i) = 0 \quad (1)$$

where: $p_1, p_2 \in \{0, 1, 2\}$ and $p_1 \neq p_2$

TABLE 1

Orthogonal cover for the case of 4 data symbols.

| Sequence index $n_{oc}^p (n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

The signal in both slots are processed similarly, but in the second slot the signal is transmitted in a different part of the spectrum, the mirrored PRB relative to the center frequency of the LTE bandwidth. Furthermore, the orthogonal cover, cyclic shift as well as scrambling sequence is changed, so that two users do not use the same orthogonal cover or cyclic shift in two consecutive slots. In Release 13 of the LTE specifications, support for low-complexity and coverage enhanced UEs were introduced. The low-complexity UE operate at a bandwidth of 6 PRBs, called a narrowband, and needs additional time to retune to the center frequency when switching between narrowbands.

One of the consequences was that the PUCCH transmission was redefined such that the frequency hopping at the slot boundaries was skipped. In addition, repetitions of all physical channels were introduced, in order to enhance the coverage.

For the PUCCH channel, frequency hopping was defined to take place at certain subframe boundaries, e.g. before subframes 0, 4, 8, 12, etc, if the frequency hopping interval is set to 4. The UE is allowed to puncture, i.e. not transmit, the last OFDM symbol, Orthogonal Frequency Division Multiplexing symbol, before a frequency hop and the first OFDM symbol after the hop, as illustrated in FIG. 1, which shows the last slot before a hop and the first slot after a hop.

One consequence of puncturing is that UEs that share the same cyclic shift are not orthogonal within a slot. This is the case since the product of the orthogonal covers, summed over only 3 symbols are not zero, which is evident from equation (1). Loss of orthogonality occurs whenever at least one UE needs to puncture one symbol. It is not necessary that both UEs puncture one symbol. One UE may e.g. be finished with its transmission before the hop and therefore does not need to retune and puncture. This loss of orthogonality, caused by punctured transmissions, leads to degraded performance, which manifests itself both as an increased miss rate, and more seriously, to an increased false detection rate. The latter could be particularly troublesome for detection of SRs, since detection of SR triggers activation of UL network resources without any real need. The degradation can be expected to be highly noticeable during scenarios where the network load is high. For a lower load the effect might be less dramatic, since the number of UEs sharing a PRB may be low, and furthermore the use of different parameters in consecutive slots might reduce the interference, so that an UE that is interfered in one slot might perhaps not be interfered in the next.

It is an object of the proposed technology to at least alleviate some of the problems that are related to orthogonality losses associated with punctured transmissions.

SUMMARY

It is an object to provide methods and systems for determining antenna weights that may be used to suppress interference caused by orthogonality losses due to the transmission of punctured signals.

It is another object to provide systems and methods for designing a beamformer based on determined antenna weights in order to suppress interference caused by orthogonality losses caused by the transmission of punctured signals.

It is yet another object to provide computer programs for determining antenna weights that may be used to suppress interference caused by orthogonality losses caused by the transmission of punctured signals.

It is yet another object to provide computer programs for designing a beamformer that may be used to suppress interference caused by orthogonality losses caused by the transmission of punctured signals.

These and other objects are met by embodiments of the proposed technology.

According to a first aspect, there is provided a method for for determining antenna weights for transmissions with punctured signals. The method comprises extracting, from a signal reception model for signals transmitted by at least two communication units, at least one of the communication units transmitting with punctured signals, a signal orthogonality loss quantity introduced by the punctured signals. The method also comprises calculating, based on the extracted signal orthogonality loss quantity, a covariance matrix quantifying the signal orthogonality loss between signals transmitted by the at least two communication units. The method further comprises determining, based on the covariance matrix, antenna weights for data symbols in the signals.

According to a second aspect, there is provided a method for designing a beamformer. The method comprises determining antenna weights according to the method of the first aspect. The method also comprises designing, based on the determined antenna weights, a beamformer accounting for an orthogonality loss introduced by punctured signals.

According to a third aspect, there is provided system configured to determine antenna weights for transmissions with punctured signals, wherein the system comprises a processing unit configured to extract, from a signal reception model for signals transmitted by at least two communication units, at least one of the communication units transmitting with punctured signals, a signal orthogonality loss quantity introduced by the punctured signals. The processing unit is also configured to calculate, based on the extracted signal orthogonality loss quantity, a covariance matrix quantifying the signal orthogonality loss between signals transmitted by the at least two communication units. The processing unit is also configured to determine, based on the covariance matrix, antenna weights for data symbols in the signals.

According to a fourth aspect, there is provided a computer program comprising instructions, which when executed by at least one processor, cause the processor(s) to:
  extract, from a signal reception model for signals transmitted by at least two communication units, at least one of the communication units transmitting with punctured signals, a signal orthogonality loss quantity introduced by the punctured signals; and
  calculate, based on the extracted signal orthogonality loss quantity, a covariance matrix quantifying the signal orthogonality loss between signals transmitted by the at least two communication units; and
  determine, based on the covariance matrix, antenna weights for data symbols in the signals.

According to a fifth aspect, there is provided a computer program comprising instructions, which when executed by at least one processor, cause the processor(s) to:
  determine antenna weights for data symbols in signals transmitted in a transmission mode with punctured signals based on a covariance matrix quantifying a signal orthogonality loss between signals transmitted by a first communication unit and at least one additional communication unit; and
  design, based on the determined antenna weights, a beamformer accounting for an orthogonality loss introduced by the punctured signals.

According to a sixth aspect there is provided an apparatus for determining antenna weights for transmissions with punctured signals. The apparatus comprises a reading module for reading, from a signal reception model for signals transmitted by at least two communication units, at least one of the communication units transmitting with punctured signals, a signal orthogonality loss quantity introduced by the punctured signals. The apparatus also comprises a processing module for calculating, based on the extracted signal orthogonality loss quantity, a covariance matrix quantifying the signal orthogonality loss between signals transmitted by the at least two communication units. The apparatus also comprises a determining module, for determining, based on the covariance matrix, antenna weights for data symbols in the signals.

According to a seventh aspect there is provided an apparatus for designing a beamformer. The apparatus comprises a reading module for reading, from a signal reception model for signals transmitted by at least two communication units, at least one of the communication units transmitting with punctured signals, a signal orthogonality loss quantity introduced by the punctured signals. The apparatus also comprises a processing module for calculating, based on the extracted signal orthogonality loss quantity, a covariance matrix quantifying the signal orthogonality loss between signals transmitted by the at least two communication units. The apparatus also comprises a determining module, for determining, based on the covariance matrix, antenna weights for data symbols in the signals. The apparatus also comprises a designing module for designing, based on the determined antenna weights, a beamformer accounting for an orthogonality loss introduced by punctured signals.

In this way it will be possible to counter at least some of the problems resulting from the loss of orthogonality. It will in particular counter degraded PUCCH detection and false alarm performance introduced by the orthogonality losses that follows from punctured signals. The fact that orthogonality losses may lead to degraded false alarm performance could be particularly troublesome for detection of Scheduling Requests, SRs, since a detection of a SR triggers activation of UL network resources without any real need. The solution proposed herein improves the performance in presence of non-orthogonality both with respect to detection performance, up to 12 dB gains at a typical operating point, and reduces the false alarm rates from very high levels down to same levels as for orthogonal users.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
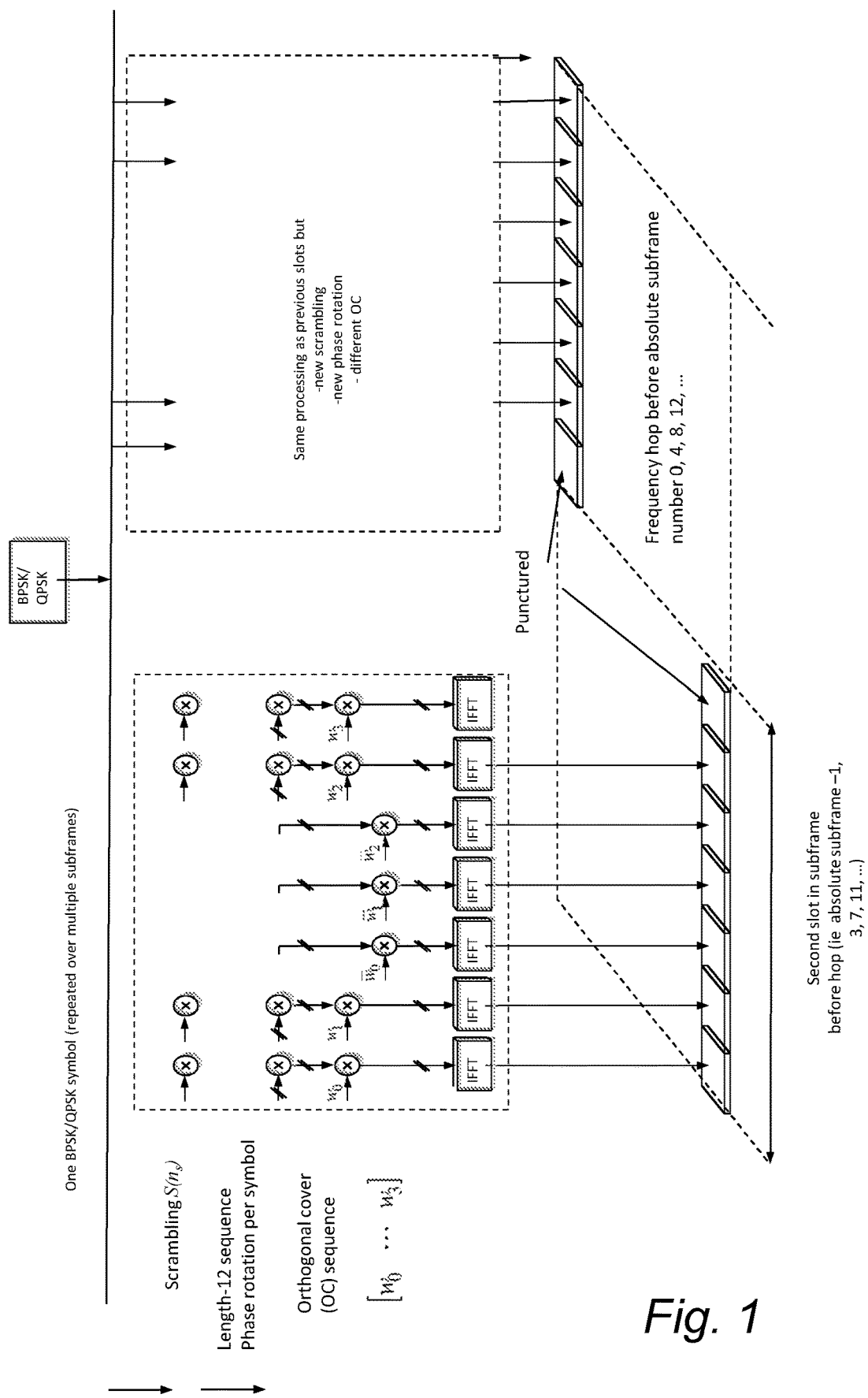
FIG. 1 is a schematic diagram illustrating a particular example with punctured transmissions.

For a better understanding of the proposed technology, it may be useful to begin with a brief system overview and/or analysis of the technical problem. To this end reference is made to FIG. 1, FIG. 9A and FIG. 9B which illustrates the transmission of punctured signals. FIG. 1 illustrates a particular example where four of the symbols in each slot contain data symbols which include the modulated information bit, which e.g. may be either ACK/NACK or SR. The remaining symbols in the slot are reference symbols used for channel estimation. For each data symbol, the modulated information is multiplied with a length-12 sequence and mapped onto 12 frequency subcarriers, followed by multiplication with a scrambling sequence, which is one complex-valued scalar value per slot, and an orthogonal cover value for the symbol. The resulting frequency domain signal is transformed to the time domain using an IFFT and a cyclic prefix is added.

Figure 9A:
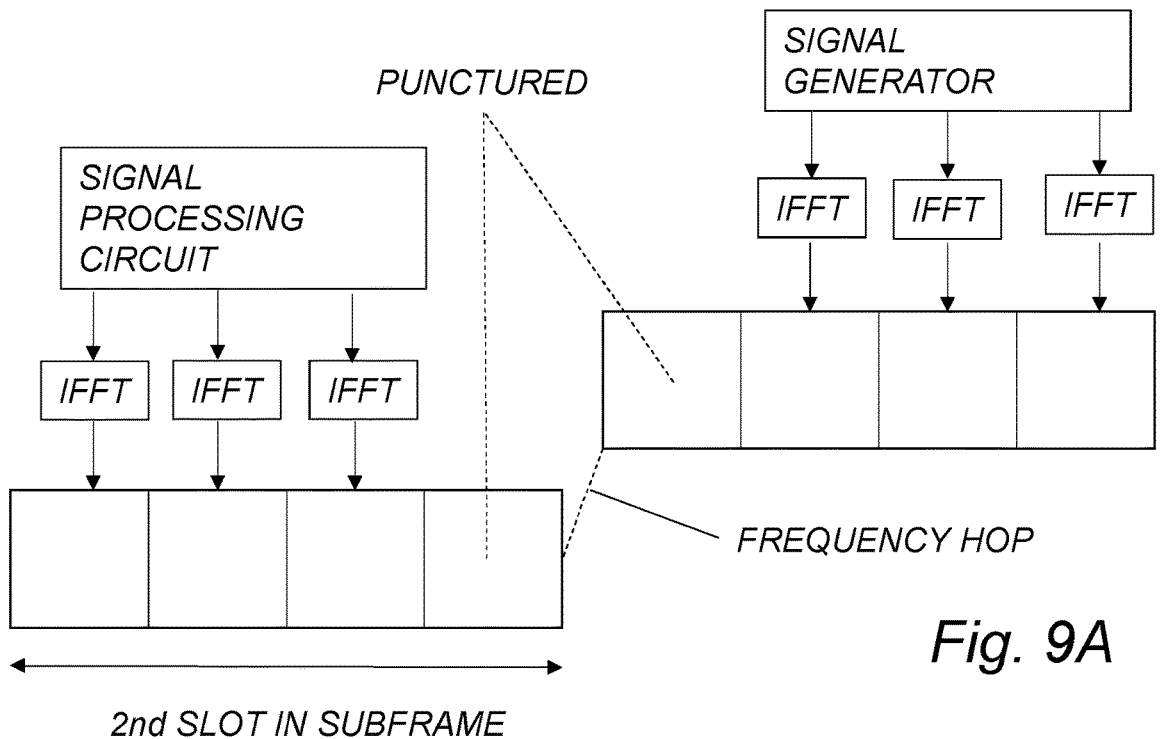
FIG. 9A is a schematic diagram illustrating the generation of a signal, e.g. a PUCCH signal, and the transmission of punctured signals.

FIG. 9A provides a simplified illustration where, for simplicity, the second slot in a subframe has been divided into four sub-slots. The drawing illustrates how signals are processed by a signal processing unit before being fed to units performing Inverse Fast Fourier Transforms, IFFT. The signal processing unit may perform various operations on the signals, e.g. scrambling, phase rotation and applying an orthogonal cover as in FIG. 1. The left side of the drawing illustrates the last slot in a sub-frame before a hop, the right hand side illustrates the first slot after the hop. Time is intended to flow from left to the right and the left side therefore illustrates the last slot before frequency retuning. The same signal processing is performed in this slot but with new scrambling and new phase rotations and orthogonal covers. In this slot the signal is also transmitted in a different part of the spectrum.

Figure 9B:
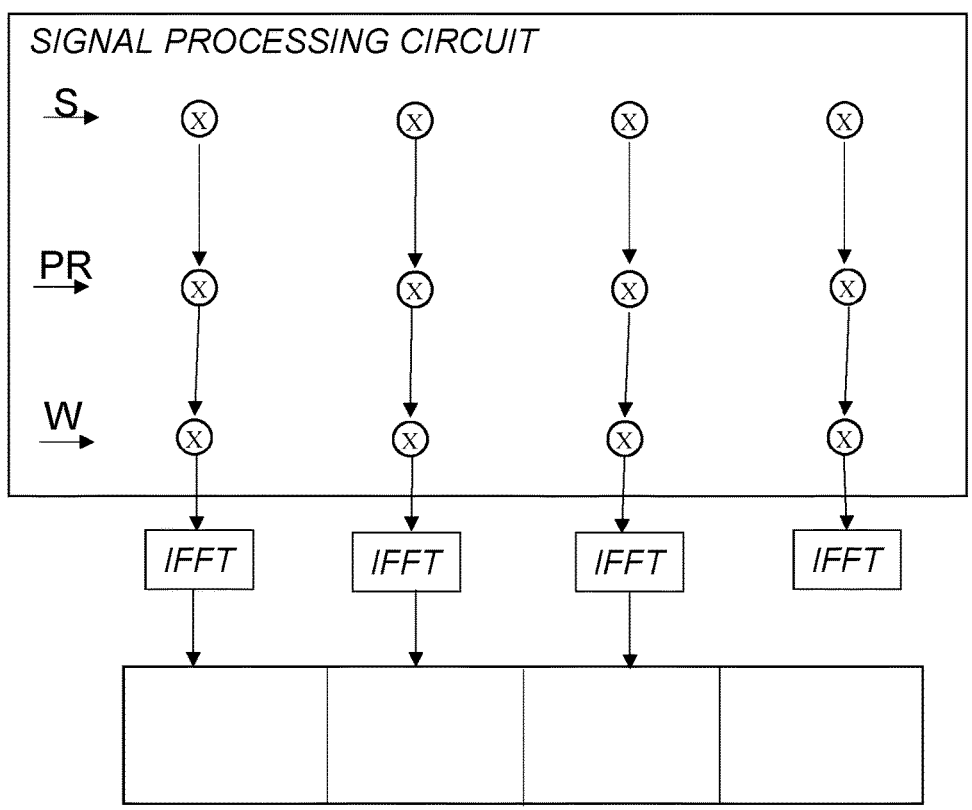
FIG. 9B is a schematic diagram illustrating the generation of e.g. a PUCCH signal in greater detail.
Figure 11:
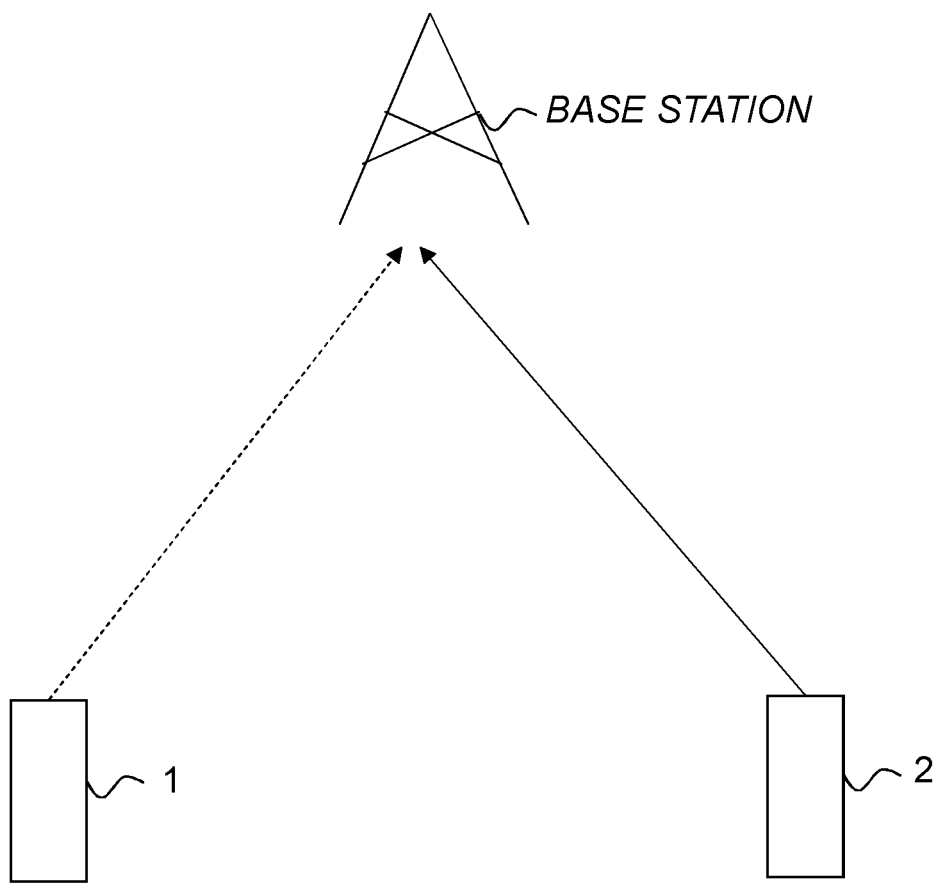
FIG. 11 is a schematic illustration of a wireless network where two communication units transmits signals to a base station. One of the communication units transmits punctured signals.

The signal processing operations are illustrated in more detail in FIG. 9B where it is illustrated how scrambling, denoted with an S, phase rotations, denoted with PR and applying orthogonal covers, denoted with a W. FIG. 1, FIG. 9A and FIG. 9B clearly illustrates how the transmitting device punctures the signal, i.e. it does not transmit, the last OFDM symbol. FIG. 11 provides an illustration where two communication units 1; 2 transmit signals to a base station, and the dashed line indicates that the communication unit 1 transmits punctured signals.

A typical receiver model will now be described in order to illustrate the orthogonality loss. The received frequency domain PUCCH signal X for two users using the same cyclic shift parameter $\alpha \in \{0, \ldots, N-1\}$ in slot $n_s$ can be written as:

$$X(k,m,n_s)=R(k)e^{\alpha(n_s)2\pi i k/N} \times (h_{p1}(n_s)W_{oc,p1}(m,n_s)S_{p1}(n_s)d_{p1}+h_{p2}(n_s)W_{oc,p2}(m,n_s)S_{p2}d_{p2})+N_{noise}(k,m,n_s) \quad (2)$$

where $k=0, \ldots, N-1$ is the subcarrier number (N=12 used for PUCCH), $m=0, \ldots, N_{DS}-1$ is the data symbol number, and $N_s=0, \ldots, N_{slots}-1$ is the slot number. In legacy LTE $N_{slots}=2$, but to simplify notation here the slot numbers are extended to account for repetitions so that $N_{slots}=2N_{rep}$. In (2), R(k) is a cell-specific base sequence, $h_{p1}$, $h_{p2}$ are the vector-valued complex propagation channels (of size equal to the number of receive antennas) from UE $p_1$ and $p_2$ respectively to the eNB, $S_p(n_s)$ is the scrambling applied in slot $n_s$ for user p, and $d_p$ is the transmitted information bit, typically BPSK modulated to $\pm 1$. $N_{noise}$, finally is the additional noise. Occasionally the slot index $n_s$ will be dropped when it is not necessary.

After element-wise multiplication of X(k, m) with R*(k) (base sequence correlation) the resulting antenna signals are transformed to the time domain with an IFFT. Since the user signals after the base sequence correlation are phase ramps, or a complex exponential function, a standard property of Fourier transforms gives that the user signals appear in only one time-domain sample. A model for the signal received at data symbol m for two users $p_1$ and $p_2$ sharing the same cyclic shift is therefore as follows $$y(m)=h_{p1}W_{oc,p1}(m)S_{p1}d_{p1}+h_{p2}W_{oc,p2}(m)S_{p2}d_{p2}+\tilde{n}_{noise}(m) \quad (3)$$

By multiplying (3) with $W_{oc,p1}(m)*S*_{p1}$ the despread and descrambled user signal is obtained as $$y_{p1}(m)=h_{p1}d_{p1}+h_{p2}X_{p1}(m)d_{p2}+n_{noise}(m) \quad (4)$$

where the definition:

$$X_{p1}(n)=W_{oc,p1}(m)*S_{p1}*W_{oc,p2}(m)S_{p2} \quad (5)$$

was used.

In (4) the additive noise is assumed to be independent between data symbols m and have a covariance matrix of $Q_0$ for all m. An estimate of the soft symbol $d_{p1}$ is typically obtained by combining the antennas samples (4) and summing over data symbols and slots according to (6) below $$\hat{d}_{p1} = \sum_{n_s=0}^{N_{slots}-1} \sum_{m=0}^{N_{DS}-1} w_{p1}^*(n_s)y_{p1}(m, n_s) \quad (6)$$

where the antenna weight vector is given by:

$$w_p = Q_0^- h_p. \quad (7)$$

This antenna weight vector will be referred to as the legacy antenna weight vector and provides a representation of an antenna weight vector that ignores the interference caused by orthogonality loss introduced by the punctured signals.

The detected soft value may, e.g., be compared to a threshold T which has been tuned to achieve a desired false alarm rate. If $\hat{d}_{p1} > T$ then a bit 0 (e.g. NACK) is assumed to have been transmitted, else if $\hat{d}_{p1} < -T$ a 1 (e.g. ACK) has been transmitted. Otherwise it is assumed that no signal was received. It can be verified that for slot $n_s$:

$$\hat{d}_{p1}(n_s) = \sum_{m=0}^{N_{DS}-1} w_{p1}^*(n_s) y_{p1}(m, n_s) = N_{DS} h_{p1}^* Q_0^{-1} h_{p1} d_{p1} + \quad (8)$$

$$h_{p1}^* Q_0^{-1} h_{p2} d_{p2} \sum_{m=0}^{N_{DS}-1} X_{p1}(m, n_s) + h_{p1}^* Q_0^{-1} \sum_{m=0}^{N_{DS}-1} n_{noise}(m) =$$

$$N_{DS} h_{p1}^* Q_0^{-1} h_{p1} d_{p1} + h_{p1}^* Q_0^{-1} \sum_{m=0}^{N_{DS}-1} n_{noise}(m)$$

where the middle summation over $X_{p1}$ (m) is zero due to the orthogonality of the cover code (1). However, when the summation is not made over all data symbols, or if the interferer is not present in all data symbols, the middle term does not vanish and the result is an orthogonality loss.

The loss of orthogonality leads to degraded performance, which is seen both as an increased miss rate, and more seriously, an increased false detection rate. The latter could be particularly troublesome for detection of SRs, since detection of SR triggers activation of UL network resources without any real need. The degradation can be expected to be noticeable when the network load is high. For low load the effect is likely less dramatic, since the number of UEs sharing a PRB may be low, and furthermore the use of different parameters in consecutive slots reduces the interference, so that an UE that is interfered in one slot is most likely not interfered in the next.

The proposed technology aims to provide mechanisms whereby the problems associated with non-orthogonality losses induced by the transmission of punctured signals are at least alleviated. The overarching principle of the proposed technology is to explicitly model the interference introduced by the non-orthogonality caused by the punctured signals and determine antenna combining weights from the model.

That is, if a particular model, that models the signal reception without taking the orthogonality loss into consideration, yields a legacy antenna weight, e.g. the antenna weight given by expression (7) above, the model that takes the orthogonality loss into consideration will yield another antenna weight. The aim of the proposed technology is to provide a way to determine these latter antenna weights. With antenna weights, or equivalently antenna weight vector or beamforming weights, is intended a vector of complex weights where each element comprises amplitude and phase information. Antenna weight vectors are e.g. used in order to determine an antenna array output. As an example, signals may be received by an antenna array that comprises N weights, represented by $W = [\omega_1, \omega_2, \omega_3, \omega_4, \ldots \omega_N]^T$, the array output y is given by $y = W^T X$, where X is a signal vector that represents an incident signal.

Figure 10:
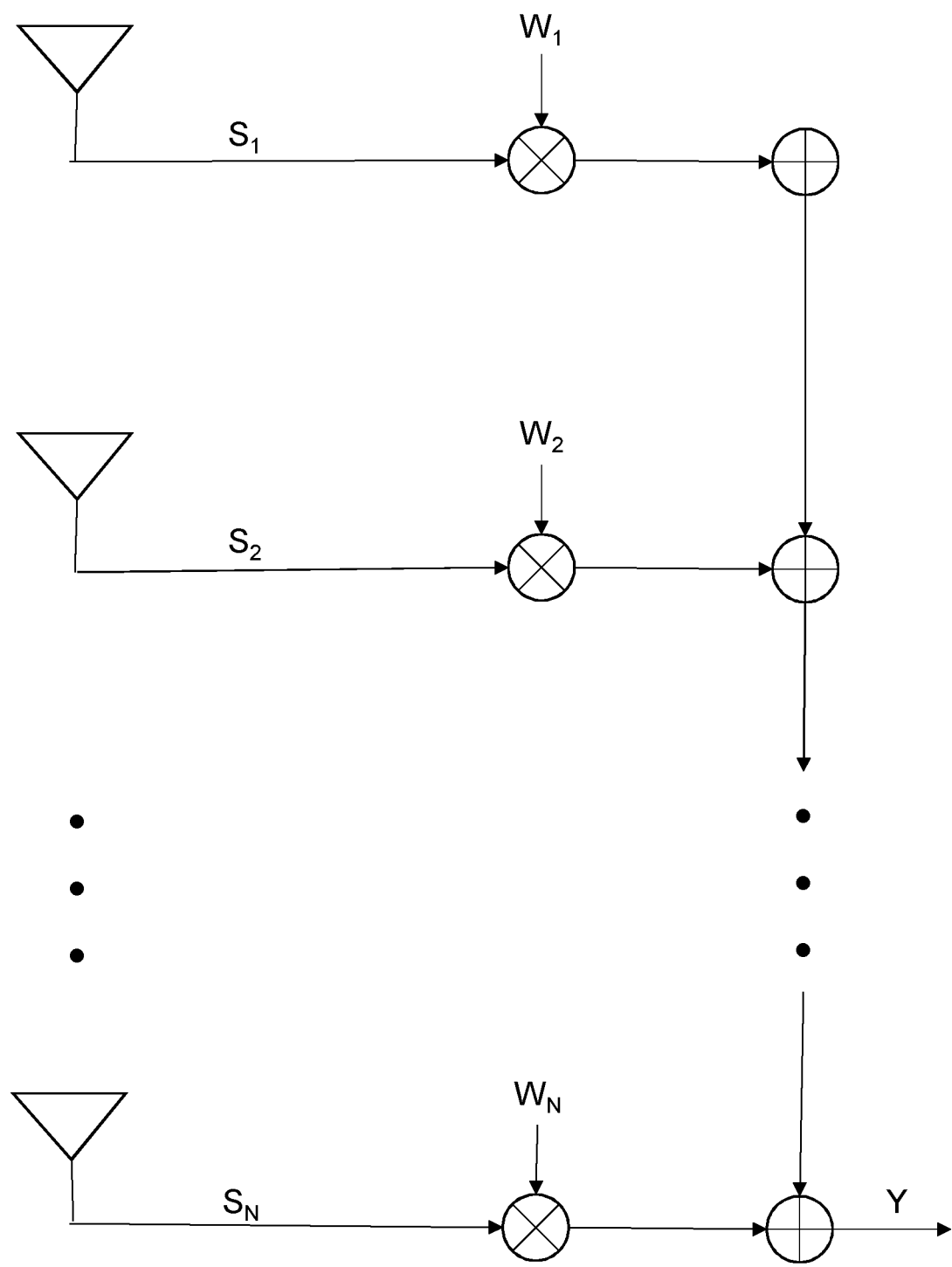
FIG. 10 is a schematic diagram illustrating how beamforming is used in a phased array antenna.

FIG. 10 provides an illustration of how signals $\{S_1, S_2 \ldots S_N\}$ are multiplied by antenna weights in a phased array antenna before being added together to yield the combined antenna signal, Y. FIG. 10 only illustrates the reception of a signal, the antenna weights may however also be used for transmitting a signal. It is thus clear that if it is possible to determine the antenna weights one may design a beamformer that suppress interferences caused by the non-orthogonality amongst the signals. According to a particular aspect of the proposed technology, the antenna weights are used to design a beamformer that acts to suppress the interference caused by the orthogonality loss. With beamformer is here intended a beamforming system or a beamforming algorithm whereby the output of, e.g. an array of antenna elements can be controlled in order to suppress the interference introduced by the orthogonality loss caused by the transmission of punctured signals.

In order for a beamformer, or a beamforming algorithm, to be able to achieve this task the beamformer needs as input the antenna weights corresponding to the orthogonality loss induced interference. These antenna weights, or equivalently antenna weight vectors or beamforming weights, may be determined by means of a proposed method to be described. This method may thus be seen as a pre-requisite for a method for designing a beamformer that can be used to suppress the induced interference caused by the orthogonality loss that follows from a transmission of punctured signals.

The proposed technology therefore provides mechanisms for determining antenna weights, or equivalently antenna weight vectors or beamforming weights, which takes non-orthogonality caused interference into consideration and designing a beamformer that allows for a suppression of the interference caused by non-orthogonality amongst punctured signals.

Figure 2:
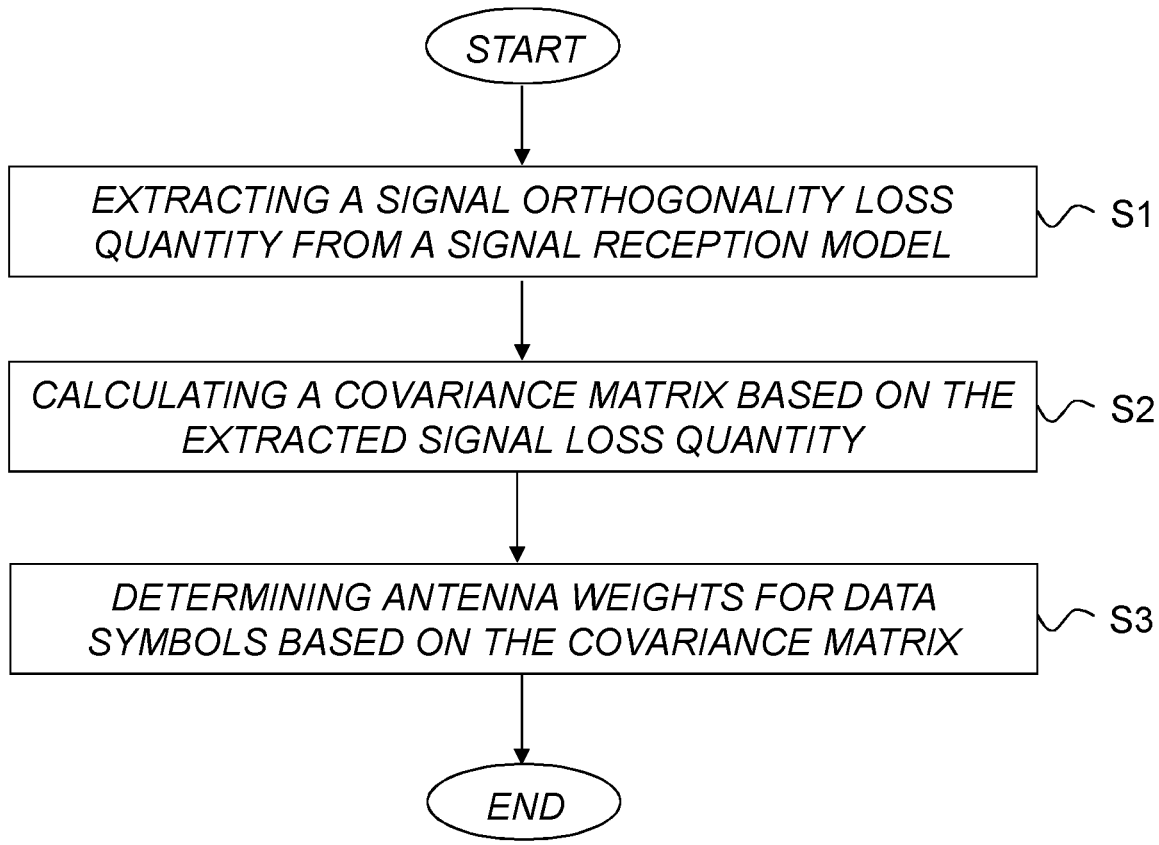
FIG. 2 is a schematic flow diagram illustrating a method for determining antenna weights according to the proposed technology.

FIG. 2 is a schematic flow diagram illustrating an example of a method for determining antenna weights for transmissions with punctured signals. The method comprises extracting S1, from a signal reception model for signals transmitted by at least two communication units 1; 2, at least one of the communication units 1; 2 transmitting with punctured signals, a signal orthogonality loss quantity introduced by the punctured signals. The method also comprises calculating S2, based on the extracted signal orthogonality loss quantity, a covariance matrix quantifying the signal orthogonality loss between signals transmitted by the at least two communication units 1; 2. The method also comprises determining S3, based on the covariance matrix, antenna weights for data symbols in the signals.

In other words the proposed method acts to determine antenna weights based on a signal reception model that models signals transmitted by at least two communication units 1; 2 where at least one of the communication units 1; 2 transmits with punctured signals. FIG. 11 provides an illustration where two communication units 1; 2 transmit signals to a base station, the dashed line indicates that the communication unit 1 transmits punctured signals. This particular scenario could induce interference caused by orthogonality loss due to the transmission of punctured signals. Based on such a model it is possible to extract a quantity that models the signal orthogonality loss. A particular signal reception model that takes this feature into account may for example be the model given by equation (2) above, where the extracted signal orthogonality loss quantity is given by the middle term in equation (8). Other models are however possible based on the particular signal representation that is used. Having selected a particular signal representation and a particular model that models transmissions with punctured signals it is possible to calculate a covariance matrix. A covariance matrix Q may be calculated for a set of vectors $X_i$, these vectors represents the various signals and their particular representation depends on the particular basis chosen for the signal reception model, by calculating $Q=E[X_i X_j^H]$, where E denotes the expectation value operator and the superscript H denotes the Hermitian conjugate. This particular procedure for obtaining a covariance matrix is well-known in the art of signal processing and the mathematical details behind the expression will not be described further. The covariance matrix obtained for the selected signal reception model provides a particular quantifier for the quantity that models the signal orthogonality loss. Having obtained the covariance matrix Q it is possible to determine the antenna weights for the data symbols by analyzing the covariance matrix. Particular examples of how to determine the antenna weights based on a calculated covariance matrix will be provided below. With data symbols are intended those OFDM symbols that include the modulated information bit. This bit may for example be an ACK/NACK or an SR. In the formula $X(k,m,n_s)$ describing the signal, the data symbol is represented by the variable m.

According to a particular embodiment of the proposed technology there is provided a method wherein the signal reception model relates to punctured signals transmitted using a sequence of identical physical resources separated by orthogonal cover sequences in a slot. It may in particular relate to a signal reception model that models transmission of punctured signals where the two communication units 1;2, shares the same cyclic shift but where their orthogonal covers differ.

The step S3 of determining the antenna weights may, according to another particular embodiment of the proposed method, be based on the inverse of the covariance matrix. Hence the covariance matrix may first be obtained based on the extracted signal orthogonality loss quantity and then inverted in order to determine, in step S3, antenna weights for the data symbols in the signals.

In other words, based on e.g. the signal model (2) and the quantity that models the signal orthogonality loss provided by the middle term (8) it is possible to arrive at a covariance matrix given by, here also the noise contribution, e.g. the second term on the right, to the covariance matrix is provided:

$$Q = \begin{pmatrix} h_{p2}X_{p1}(0) \\ h_{p2}X_{p1}(1) \\ h_{p2}X_{p1}(2) \\ h_{p2}X_{p1}(3) \end{pmatrix} \begin{pmatrix} h_{p2}^* X_{p1}^*(0) & h_{p2}^* X_{p1}^*(1) & h_{p2}^* X_{p1}^*(2) & h_{p2}^* X_{p1}^*(3) \end{pmatrix} +$$

$$\begin{pmatrix} Q_0 & 0 & 0 & 0 \\ 0 & Q_0 & 0 & 0 \\ 0 & 0 & Q_0 & 0 \\ 0 & 0 & 0 & Q_0 \end{pmatrix}$$

here also the noise contribution, e.g. the second term on the right, to the covariance matrix is provided:

This matrix may be inverted to arrive at a particular $Q^{-1}$. The inverted matrix will in this particular example be given by:

$$Q_{i,j}^{-1} = Q_0^{-1}\delta(i-j) - \frac{Q_0^{-1} h_{p2} h_{p2}^* Q_0^{-1} X_{p1}(i) X_{p1}^*(j)}{\gamma_{p2}}$$

where:

$\gamma_{p2} = 1+(N_{DS}-1)h_{p2}^* \hat{Q}_0^{-1} h_{p2} = 1+SNR_{p2}$

Having obtained an expression for the inverted matrix, the antenna weights for the m.th symbol can then be calculated as:

$w_p(m) =$ $$Q_{row(m)}^{-1} \begin{pmatrix} h_{p1} \\ h_{p1} \\ h_{p1} \\ h_{p1} \end{pmatrix} = Q_0^{-1} h_{p1} - \frac{Q_0^{-1} h_{p2} h_{p2}^* \hat{Q}_0^{-1} X_{p1}(m) \sum_{j=0}^{N_{DS}-1} X_{p1}^*(j)}{\gamma_{p2}} h_{p1} \quad (**)$$

The right-hand side of this expression can now be used to obtain the sought-for antenna weights $w_{p1,add} = Q_{p1,add} h_{p1}$, where:

$$Q_{p1,add} = \frac{1}{\gamma_{p2}} w_{p2} w_{p2}^* \sum_{j=0}^{3} X_{p1}^*(j) \quad (***)$$

This was possible since the right-hand side of the antenna weights $w_p(m)$ only depend on m through $X_{p1}(m)$. A particular expression for the estimated soft value where the antenna weights represented by the expression (***) are present may thus be obtained as:

$$\hat{d}_{p1} = \sum_{n_s=0}^{2N_{rep}-1} \sum_{m=0}^{N_{DS}-1} (w_{p1}^*(n_s) - w_{p1,add}^*(n_s) X_{p1}^*(m, n_s)) y_{p1}(m, n_s)$$

For this particular model it is possible to compare the soft value for the case where an orthogonality-loss was not accounted for, i.e.:

$$\hat{d}_{p1} = \sum_{n_s=0}^{N_{slots}-1} \sum_{m=0}^{N_{DS}-1} w_{p1}^*(n_s) y_{p1}(m, n_s)$$

with the case where the orthogonality-loss was accounted for:

$$\hat{d}_{p1} = \sum_{n_s=0}^{2N_{rep}-1} \sum_{m=0}^{N_{DS}-1} (w_{p1}^*(n_s) - w_{p1,add}^*(n_s) X_{p1}^*(m, n_s)) y_{p1}(m, n_s)$$

The difference being that the antenna weights differ. This provides a particular example of how the proposed method may be used to obtain or determine antenna weights where the non-orthogonality loss is accounted for.

By way of example, the proposed technology provides a method wherein the communication units 1; 2 comprises User Equipment's, UEs, and the signals are transmitted on a physical uplink channel and the determined antenna weights are receive antenna weights for reception on the uplink.

Yet another embodiment of the proposed technology provides a method wherein the physical uplink channel comprises the Physical Uplink Control Channel, PUCCH.

An alternative embodiment of the proposed technology provides a method wherein the communication units 1; 2 comprises network nodes and the signals are transmitted on a downlink channel and the antenna weights are transmit antenna weights used for transmission on the downlink.

According to a particular embodiment of the proposed technology there is provided a method that further comprises to obtain an estimate of a soft symbol based on the determined antenna weights and utilizing the estimate to determine whether an ACK or NACK was transmitted with punctured signals.

Yet another embodiment of the proposed technology provides a method according to that further comprises to obtain an estimate of the Signal to Noise Ratio, SINR, per slot for the signals based on the determined antenna weights and utilizing the estimate of the SINR to determine whether a Scheduling Request, SR, was transmitted with punctured signals.

The proposed embodiment may be suitable for measurement purposes as an SINR estimate is often needed. A concrete example based on the selected signal reception model is briefly outlined below.

In the legacy case SINR is calculated per slot as:

$$\hat{s}_p(n_s) = \mathcal{R}\{w_p^*(n_s)h_p(n_s)\}$$

where $\mathcal{R}\{\ \}$ denotes the real-part operator. For Cat-M with new IRC for retuning, the SINR will be adjusted per slot as $$\left\{w_p^*(n_s) - w_{p,add}^*(n_s)\sum_{m=0}^{N_{DS}-1} X_{p1}^*(n_s, m)\right\}$$

It is clear from the two expressions above that there is a difference in the antenna weights between the legacy antenna weights provided by $w_{p1}^*(n_s)$, and the combined antenna weights provided by:

$$\left\{w_p^*(n_s) - w_{p,add}^*(n_s)\sum_{m=0}^{N_{DS}-1} X_{p1}^*(n_s, m)\right\}$$

The averaging over all slots may then be performed in order to get:

$$\tilde{s}_p = \sum_{n_s=0}^{N_{slots}-1} \hat{s}_p(n_s)$$

Below will follow a concrete example of how the proposed technology can be implemented in order to determine antenna weights for transmissions that allow at least one communication unit, e.g. at least one User Equipment, UE, to transmit with punctured signals. The particular example provided relates to a particular signal reception model and the computation steps are thus dependent on the particular model.

There are however a large amount of signal reception models that may be used for describing the transmission and reception that may all be used to obtain a orthogonality loss quantity on which a covariance matrix may be determined. The following section are therefore merely considered as concrete examples.

The following example provides a particular way to explicitly model an interference, e.g. a PUCCH-interference, which could be introduced by Cat-M UEs that need to puncture certain OFDM symbols. The example will illustrate how the method, based on the selected signal reception model, can determine antenna combining weights that may be used to suppress the non-orthogonal interference.

The main objective is thus to derive an expression which takes into account the interference from the non-zero middle term in (8) and to arrive at new antenna combining weights that suppress the interference. To make the description general, it is assumed that truncation is modelled by setting $X_{p1}(m)=0$ for truncated symbols. The equation (4) can then be re-written in matrix form as $$\begin{pmatrix} y_{p1}(0) \\ y_{p1}(1) \\ y_{p1}(2) \\ y_{p1}(3) \end{pmatrix} = \begin{pmatrix} h_{p1} \\ h_{p1} \\ h_{p1} \\ h_{p1} \end{pmatrix} d_{p1} + \begin{pmatrix} h_{p2}X_{p1}(0) \\ h_{p2}X_{p1}(1) \\ h_{p2}X_{p1}(2) \\ h_{p2}X_{p1}(3) \end{pmatrix} d_{p2} + \begin{pmatrix} n_{noise}(0) \\ n_{noise}(1) \\ n_{noise}(2) \\ n_{noise}(3) \end{pmatrix}$$

Note that the third term on the right side represents the noise contribution. This contribution is not an essential ingredient for determining the antenna weights according to the proposed technology, which on the contrary can be determined based on the first two terms. The noise contribution can be seen as an optional contribution.

The covariance matrix of the interferer plus the optional noise contribution is, $$Q = \begin{pmatrix} h_{p2}X_{p1}(0) \\ h_{p2}X_{p1}(1) \\ h_{p2}X_{p1}(2) \\ h_{p2}X_{p1}(3) \end{pmatrix} (h_{p2}^*X_{p1}^*(0)\ h_{p2}^*X_{p1}^*(1)\ h_{p2}^*X_{p1}^*(2)\ h_{p2}^*X_{p1}^*(3)) + \begin{pmatrix} Q_0 & 0 & 0 & 0 \\ 0 & Q_0 & 0 & 0 \\ 0 & 0 & Q_0 & 0 \\ 0 & 0 & 0 & Q_0 \end{pmatrix}$$

Using the so-called matrix inversion lemma, the (i, j)-th block of the inverse of Q can be expressed as $$Q_{i,j}^{-1} = Q_0^{-1}\delta(i-j) - \frac{Q_0^{-1}h_{p2}h_{p2}^*Q_0^{-1}X_{p1}(i)X_{p1}^*(j)}{\gamma_{p2}}$$

with $$\gamma_{p2} = 1 + (N_{DS}-1)h_{p2}^*\hat{Q}_0^{-1}h_{p2} = 1 + SNR_{p2}$$

The weights for the m.th symbol can then be calculated as $$w_p(m) = Q_{row(m)}^{-1}\begin{pmatrix} h_{p1} \\ h_{p1} \\ h_{p1} \\ h_{p1} \end{pmatrix} = Q_0^{-1}h_{p1} - \frac{Q_0^{-1}h_{p2}h_{p2}^*\hat{Q}_0^{-1}X_{p1}(m)\sum_{j=0}^{N_{DS}-1}X_{p1}^*(j)}{\gamma_{p2}}h_{p1}$$

It is clear that the right-hand side depends on m only through $X_{p1}(m)$ so it can be re-written as follows. Define, $$Q_{p1,add} = \frac{1}{\gamma_{p2}}w_{p2}w_{p2}^*\sum_{j=0}^{3}X_{p1}^*(j)$$

and define the additional antenna weights as:

$$w_{p1,add} = Q_{p1,add}h_{p1}$$

Using the obtained additional antenna weights one may for example reach a final expression for the estimated soft value given by:

$$\hat{d}_{p1} = \sum_{n_s=0}^{2N_{rep}-1}\sum_{m=0}^{N_{DS}-1}(w_{p1}^*(n_s) - w_{p1,add}^*(n_s)X_{p1}^*(m,n_s))y_{p1}(m,n_s)$$

Here the slot number was added in the final calculation, and also, to simplify notation, the repetitions over $N_{rep}$ subframes are expressed as summation of $2*N_{rep}$ slots. Note also that the interfering UEs $p_2$ in different slots/repetitions are typically not the same, and that in some slots no interference is present. For those slots the antenna weighting vector is the legacy only, i.e: $w^*_{p1}(n_s)$.

All expressions described herein have used the true channels and covariances. In reality these quantities have to be estimated based on reference symbols and possibly also data symbols. Methods for this are well known in the art and not described herein.

The proposed invention has described the situation with two UEs sharing the same cyclic shift in a PUCCH slot. The 3GPP standard allows however that up to three UEs share the same cyclic shift. The formulas derived herein can easily be extended to cover this case. Another option to handle three UEs is to only explicitly model the strongest interferer.

The proposed technology also provides for a method for controlling a reception of signals based on the determined antenna weights. Specifically the reception of punctured signals. The various described embodiments of the method for determining the antenna weights may therefore also be seen as a pre-requisite for a method for controlling the reception of signals in order to suppress interference caused by an orthogonality loss that emerges from the transmission of punctured signals.

The proposed technology also provides a method for designing a beamformer based on the antenna weights determined by the earlier described method. With beamformer is here intended a beamforming algorithm or a beamforming system whereby the output of, e.g. an array of antenna elements can be controlled in order to suppress the interference introduced by the orthogonality loss. A beamformer, or a beamforming algorithm, capable of achieving this needs the determined antenna weights as input. With beamforming is intended a signal processing technique that may be employed to achieve directional signal transmissions or signal receptions.

Beamforming may be achieved by combining antenna elements in an antenna array in such a way that signals at particular angles experience constructive interference while signals at other angles experience destructive interference. Beamforming can be used at both the transmitting and receiving ends. FIG. 10 provides a schematic illustration of beamforming where signals $S_1, S_2 \ldots S_N$ are multiplied by corresponding antenna weights before being summed to yield an antenna combined signal, Y.

Figure 3:
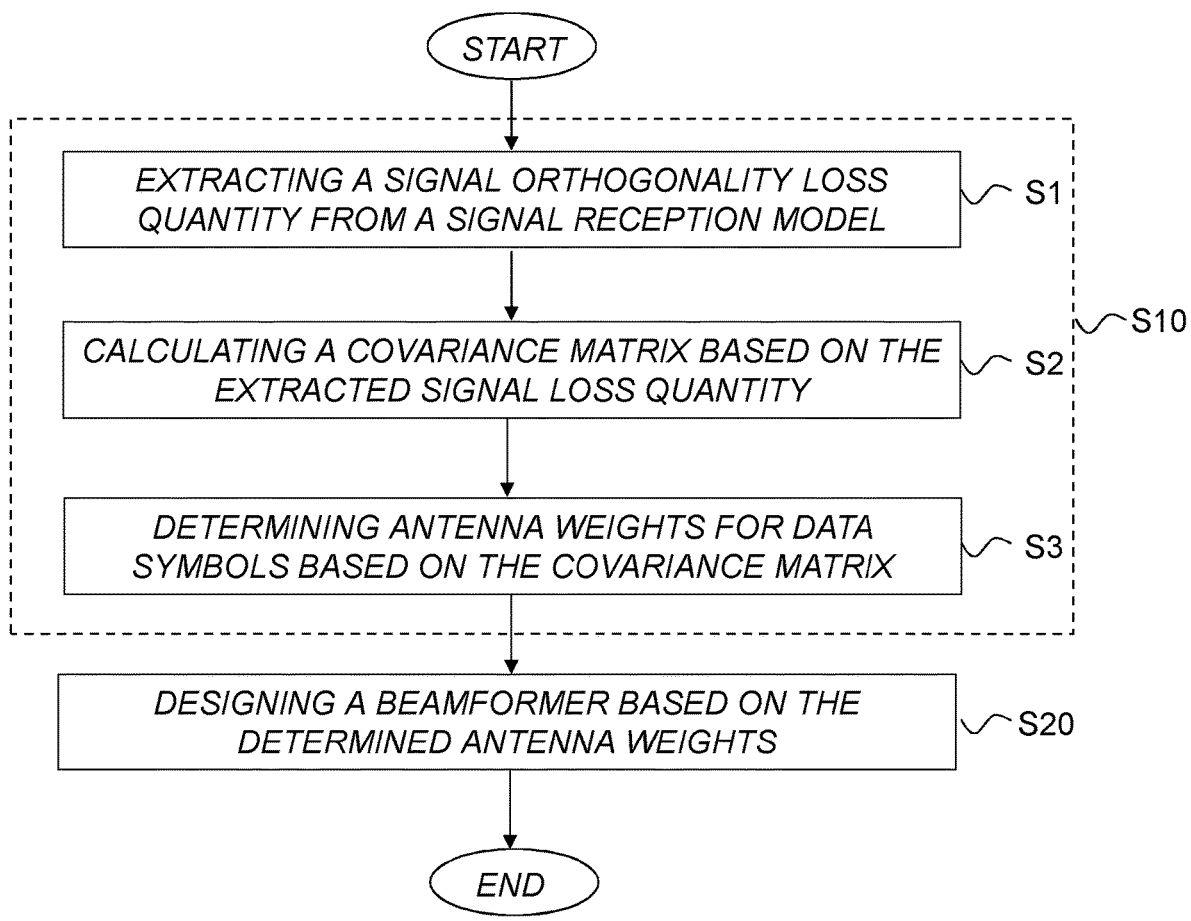
FIG. 3 is a schematic flow diagram illustrating a method according to the proposed technology for designing a beamformer based on the determined antenna weights.

To this end the proposed technology provides a method for designing a beamformer. The method comprises determining S10 antenna weights according to the earlier described method for determining antenna weights. The method also comprises designing S20, based on the determined antenna weights, a beamformer accounting for an orthogonality loss introduced by punctured signals. The method is schematically illustrated in the flow diagram of FIG. 3.

A particular embodiment of the proposed technology comprises a method wherein the antenna weights comprises receive antenna weights and the step S20 of designing a beamformer comprises designing a receive beamformer.

Another embodiment of the proposed technology comprises a method wherein the receive beamformer is used to enable the reception of signals on the uplink or the downlink.

Having described the proposed methods in considerable detail, in what follows we will describe several system architectures and devices that are suitable to perform the proposed method. In several instances in the disclosure we refer to communication units which includes both network nodes and/or associated wireless communication devices. As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "network device" may refer to any device located in connection with a communication network, including but not limited to devices in access networks, core networks and similar network structures. The term network device may also encompass cloud-based network devices.

All benefits and advantages that were highlighted in the description of the described methods are equally valid for the device/system description and will not be repeated.

The proposed technology thus provides a system 100 that is configured to determine antenna weights for transmissions with punctured signals. The system 100 comprises a processing unit 10 that is configured to extract, from a signal reception model for signals transmitted by at least two communication units 1; 2, at least one of the communication units 1; 2 transmitting with punctured signals, a signal orthogonality loss quantity introduced by the punctured signals. The processing unit 10 is also configured to calculate, based on the extracted signal orthogonality loss quantity, a covariance matrix quantifying the signal orthogonality loss between signals transmitted by the at least two communication units 1; 2. The processing unit 10 is further configured to determine, based on the covariance matrix, antenna weights for data symbols in the signals.

A particular embodiment of the proposed technology provides a system 100 wherein the signal reception model relates to signals transmitted using a sequence of identical physical resources separated by orthogonal cover sequences in a slot.

Another particular embodiment of the proposed technology provides a system 100 wherein the processing unit 10 is further configured to determine the antenna weights based on the inverse of the covariance matrix.

Yet another embodiment of the proposed technology provides a system 100 wherein the communication units 1; 2 comprises User Equipment's, UEs, and the signals are transmitted on a physical uplink channel, and wherein the processing unit 10 is configured to determine receive antenna weights for reception on the uplink.

Still another embodiment of the proposed technology provides a system 100 wherein the processing unit is configured to determine receive antenna weights for reception on a Physical Uplink Control Channel, PUCCH.

By way of example, the proposed technology provides a system 100 wherein the communication units 1; 2 comprises network nodes and the signals are transmitted on a downlink channel, and wherein the processing unit 10 is configured to determine transmit antenna weights for transmission on the downlink.

An optional embodiment of the proposed technology provides a system 100 wherein the processing unit 10 is further configured to obtain an estimate of a soft symbol based on the determined antenna weights.

Another optional embodiment of the proposed technology provides a system 100 wherein the processing unit 10 is further configured to obtain an estimate of the Signal to Noise Ratio, SINR, per slot for the signals based on the determined antenna weights.

Figure 4A:
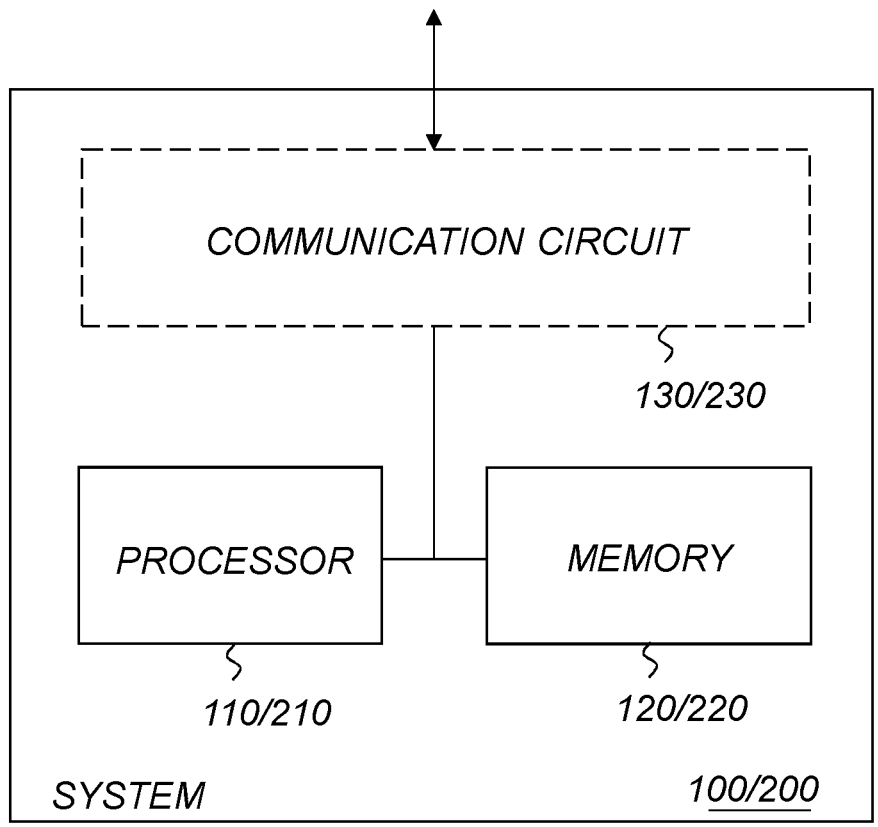
FIG. 4A is a schematic block diagram illustrating an embodiment of a system according to the proposed technology that is configured to determine antenna weights.

A particular embodiment of the proposed technology provides a system 100 that comprises a processor 110 and a memory 120, the memory 120 comprising instructions executable by the processor 110, whereby the processor is operative to determine antenna weights for a transmission mode with punctured signals. FIG. 4A provides a block diagram illustrating a particular example of such an embodiment.

Optionally, system 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). FIG. 4A provides a block diagram that illustrates such a system.

Figure 4B:
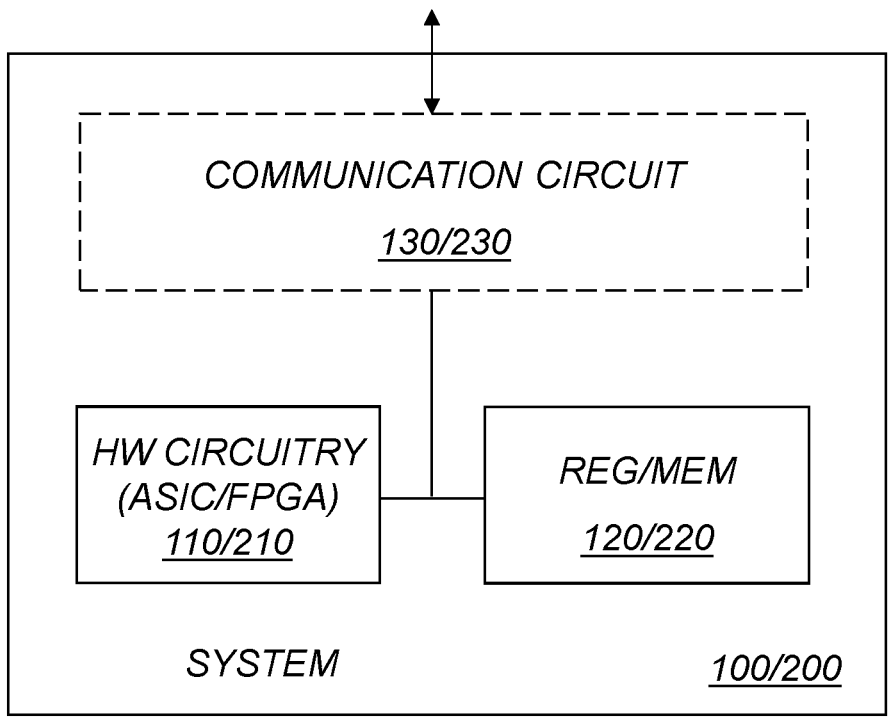
FIG. 4B is a schematic block diagram illustrating an embodiment of a system, according to the proposed technology, that is configured to design a beamformer.

FIG. 4B is a schematic block diagram illustrating another example of an arrangement/system 100, based on a hardware circuitry implementation according to an embodiment. Particular examples of suitable hardware circuitry 110 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120.

It is also possible to provide a solution based on a combination of hardware and software. The actual hardware-software partitioning can be decided by a system designer based on a number of factors including processing speed, cost of implementation and other requirements.

Figure 5:
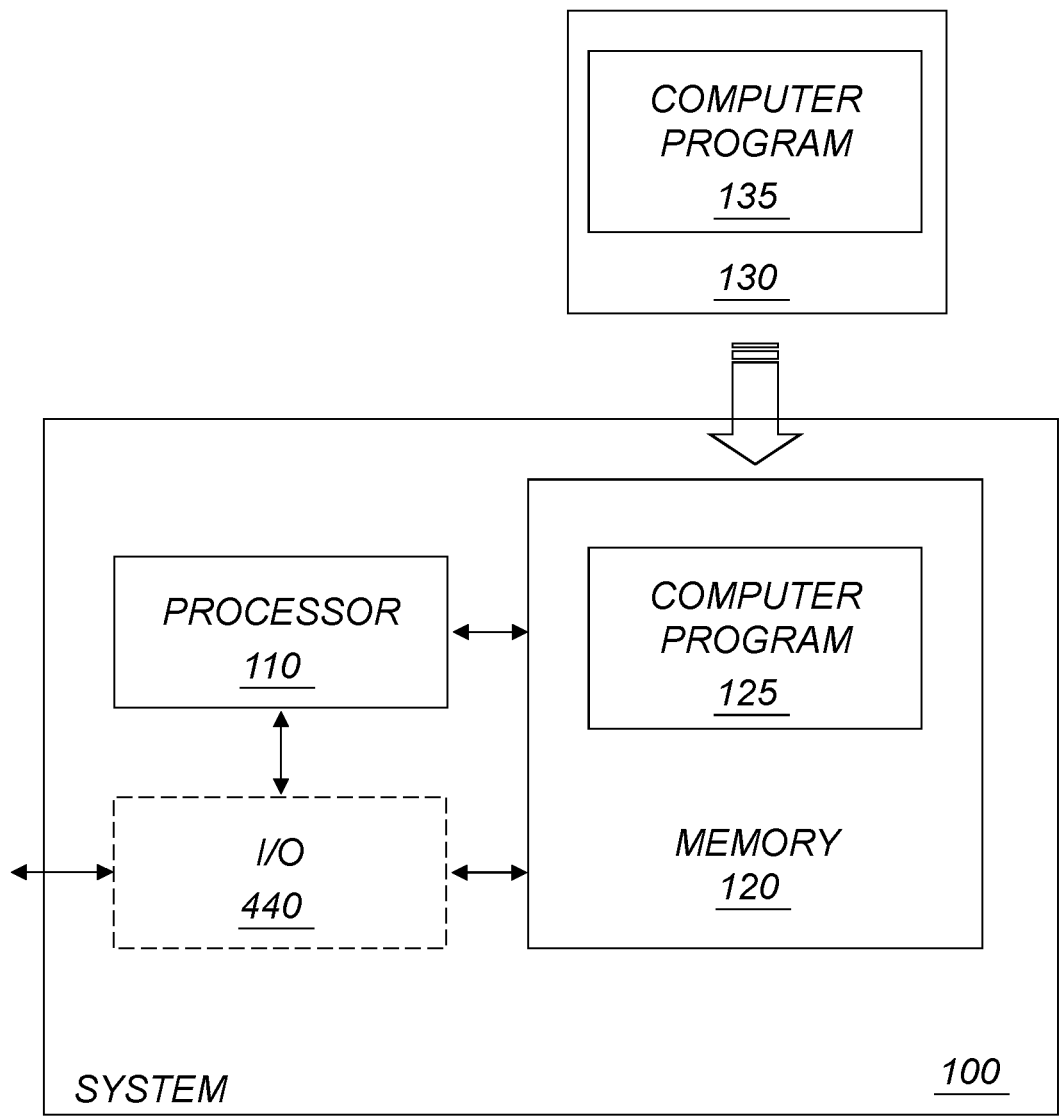
FIG. 5 is a schematic block diagram illustrating a computer program implementation for determining antenna weights.
Figure 6:
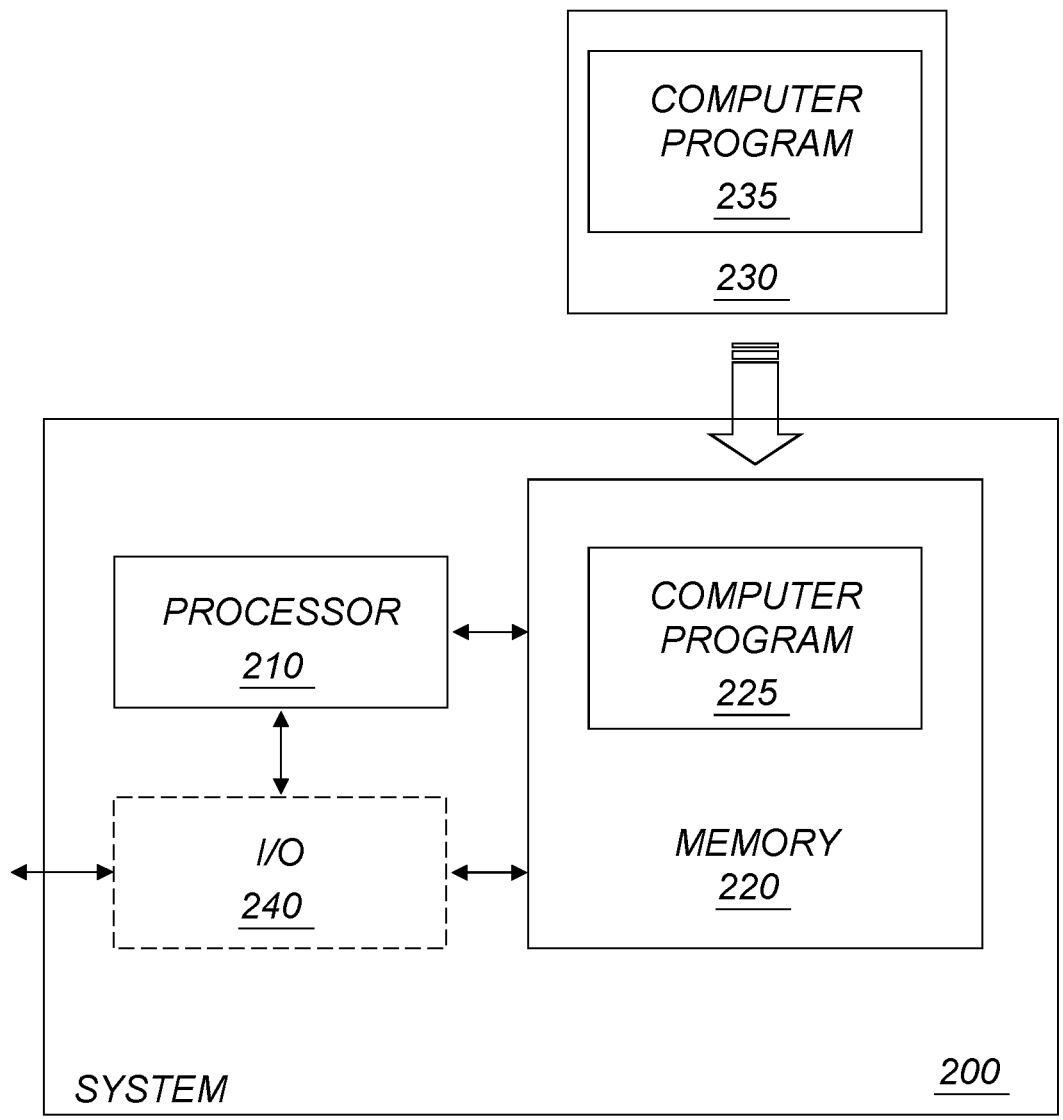
FIG. 6 is a schematic block diagram illustrating a computer program implementation for designing a beamformer.

FIG. 5 is a schematic diagram illustrating an example of a computer-implementation according to an embodiment. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

In a particular embodiment, the computer program 125; 135 comprising instructions, which when executed by at least one processor 110, cause the processor(s) 110 to:
  extract, from a signal reception model for signals transmitted by at least two communication units 1; 2, at least one of the communication units 1; 2 transmitting with punctured signals, a signal orthogonality loss quantity introduced by the punctured signals;
  calculate, based on the extracted signal orthogonality loss quantity, a covariance matrix quantifying the signal orthogonality loss between signals transmitted by the at least two communication units 1; 2;

determine, based on the covariance matrix, antenna weights for data symbols in the signals.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a system 200 that is configured to design a beamformer. This system could comprise, or be connected to, a system that is configured to determine antenna weights for transmissions with punctured signals according to what was described above.

A particular system 200 that is configured to design a beamformer might comprise a processing unit 100 that is configured to determine antenna weights. The system also comprises a beam designing unit 200 that is configured to design, based on the determined antenna weights, a beamformer accounting for an orthogonality loss introduced by punctured signals.

A particular embodiment of such a system comprises a system wherein the antenna weights comprises receive antenna weights and wherein the beam designing unit 200 is configured to design a receive beamformer.

Another possible embodiment provides a system wherein the system is configured to design a beamformer for receiving signals on the uplink or the downlink.

A particular embodiment of such a system is illustrated in FIG. 4A. FIG. 4A illustrates a system that comprises a processor 210 and a memory 220, the memory 220 comprising instructions executable by the processor 210, whereby the processor is operative to design a beamformer.

Optionally, system 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. By way of example, the communication circuit 230 may include any of the following: a receiver, a transmitter, a transceiver, input/output (I/O) circuitry, input port(s) and/or output port(s). FIG. 4A provides a block diagram that illustrates such a system.

FIG. 4B is a schematic block diagram illustrating another example of a system 200, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

The proposed technology also provides a system for controlling reception and/or transmission of signals by utilising antenna weights. To this end the system comprises a processing unit for determining antenna weights for transmissions with punctured signals, the system also comprises a controlling unit that is configured to control the transmission and/or reception of punctured signals based on the determined antenna weights.

It is also possible to provide a solution based on a combination of hardware and software. The actual hardware-software partitioning can be decided by a system designer based on a number of factors including processing speed, cost of implementation and other requirements.

FIG. 5 is a schematic diagram illustrating an example of a computer-implementation according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program comprising instructions, which when executed by at least one processor 210, cause the processor(s) 210 to:

determine antenna weights for data symbols in signals transmitted in a transmission mode with punctured signals based on a covariance matrix quantifying a signal orthogonality loss between signals transmitted by a first communication unit 1 and at least one additional communication unit 2; and design, based on the determined antenna weights, a beamformer accounting for an orthogonality loss introduced by the punctured signals It will be appreciated that the methods and arrangements described herein can be implemented, combined and re-arranged in a variety of ways.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 7:
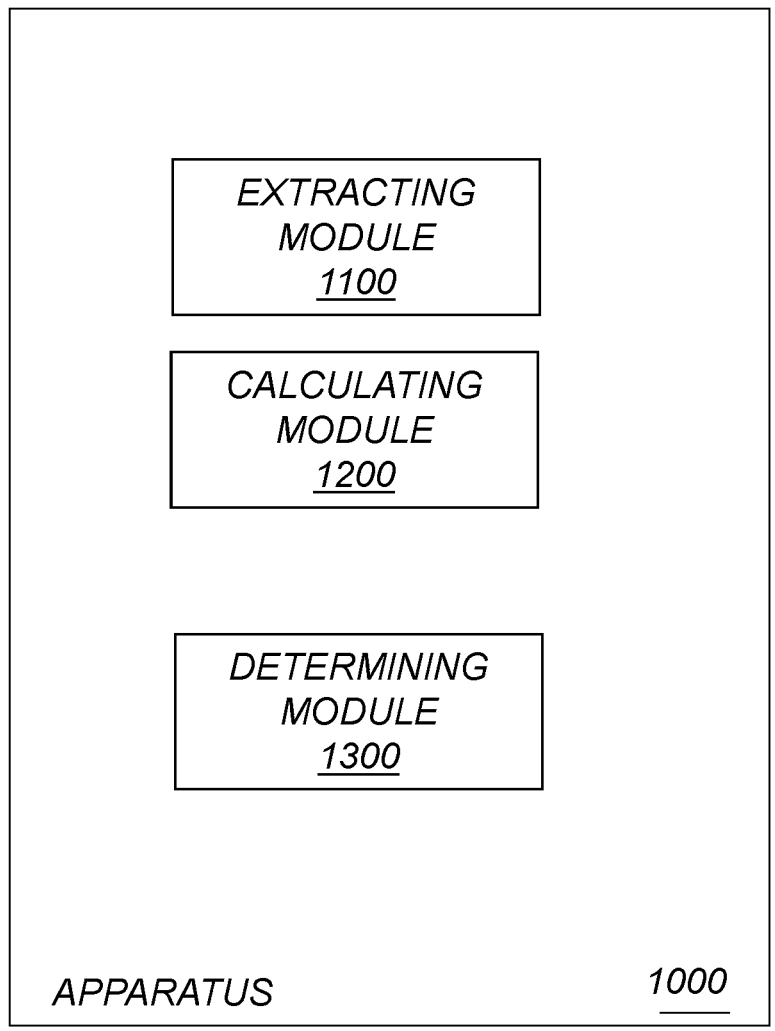
FIG. 7 is a diagram illustrating an apparatus according to the proposed technology wherein the apparatus is configured to determine antenna weights.

FIG. 7 is a schematic diagram illustrating an example of an apparatus 1000 for determining antenna weights for transmissions with punctured signals. The apparatus 1000 comprises a reading module 1100 for reading, from a signal reception model for signals transmitted by at least two communication units 1; 2, at least one of the communication units 1; 2 transmitting with punctured signals, a signal orthogonality loss quantity introduced by the punctured signals. The apparatus 1000 also comprises a processing module 1200 for calculating, based on the extracted signal orthogonality loss quantity, a covariance matrix quantifying the signal orthogonality loss between signals transmitted by the at least two communication units 1; 2. The apparatus also comprises a determining module 1200, for determining, based on the covariance matrix, antenna weights for data symbols in the signals.

Figure 8:
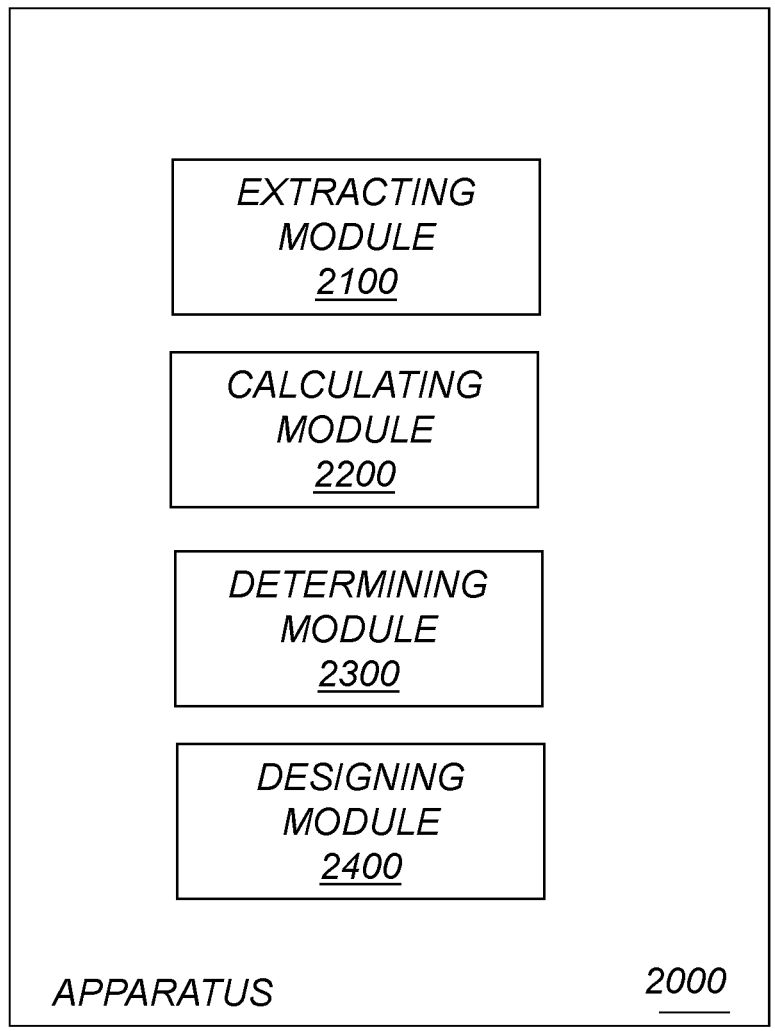
FIG. 8 is a diagram illustrating an apparatus according to the proposed technology wherein the apparatus is configured to design a beamformer.

FIG. 8 is a schematic diagram illustrating an example of an apparatus 2000 for designing a beamformer. The apparatus 2000 comprises a reading module 2100 for reading, from a signal reception model for signals transmitted by at least two communication units 1; 2, at least one of the communication units 1; 2 transmitting with punctured signals, a signal orthogonality loss quantity introduced by the punctured signals. The apparatus 2000 also comprises a processing module 2200 for calculating, based on the extracted signal orthogonality loss quantity, a covariance matrix quantifying the signal orthogonality loss between signals transmitted by the at least two communication units 1; 2. The apparatus also comprises a determining module 2300, for determining, based on the covariance matrix, antenna weights for data symbols in the signals. The apparatus also comprises a designing module S2400 for designing, based on the determined antenna weights, a beamformer accounting for an orthogonality loss introduced by punctured signals.

Alternatively it is possible to realize the module(s) in FIGS. 7 and 8 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for determining antenna weights for transmissions with punctured signals, the method comprising:
    extracting, from a signal reception model for signals transmitted by at least two communication units, at least one of said communication units transmitting with punctured signals, a signal orthogonality loss quantity introduced by said punctured signals;
    calculating, based on the extracted signal orthogonality loss quantity, a covariance matrix quantifying said signal orthogonality loss quantity between signals transmitted by said at least two communication units; and
    determining, based on said covariance matrix, the antenna weights for data symbols in said signals.

2. The method according to claim 1, wherein said signal reception model relates to punctured signals transmitted using a sequence of identical physical resources separated by orthogonal cover sequences in a slot.

3. The method according to claim 1, wherein the step of determining said antenna weights is based on an inverse of said covariance matrix.

4. The method according to claim 1, wherein said communication units comprise User Equipments (UEs), and said signals are transmitted on a physical uplink channel and said determined antenna weights are receive antenna weights for reception on the physical uplink channel.

5. The method according to claim 4, wherein said physical uplink channel comprises the Physical Uplink Control Channel (PUCCH).

6. The method according to claim 1, wherein said communication units comprise network nodes and said signals are transmitted on a downlink channel and said antenna weights are transmit antenna weights used for transmission on the downlink channel.

7. The method according to claim 1, wherein the method further comprises obtaining an estimate of a soft symbol based on said determined antenna weights and utilizing said estimate to determine whether an ACK or NACK was transmitted with punctured signals.

8. The method according to claim 1, wherein the method further comprises obtaining an estimate of a Signal to Noise Ratio (SINR) per slot for said signals based on said determined antenna weights and utilizing said estimate of the SINR to determine whether a Scheduling Request (SR) was transmitted with punctured signals.

9. A system configured to determine antenna weights for transmissions with punctured signals, wherein the system comprises a processing unit configured to:
   extract, from a signal reception model for signals transmitted by at least two communication units, at least one of said communication units transmitting with punctured signals, a signal orthogonality loss quantity introduced by said punctured signals;
   calculate, based on the extracted signal orthogonality loss quantity, a covariance matrix quantifying said signal orthogonality loss quantity between signals transmitted by said at least two communication units; and
   determine, based on said covariance matrix, the antenna weights for data symbols in said signals.

10. The system according to claim 9, wherein said signal reception model relates to signals transmitted using a sequence of identical physical resources separated by orthogonal cover sequences in a slot.

11. The system according to claim 9, wherein the processing unit is further configured to determine said antenna weights based on an inverse of said covariance matrix.

12. The system according to claim 9, wherein said communication units comprise User Equipments (UEs) and said signals are transmitted on a physical uplink channel, and wherein said processing unit is configured to determine receive antenna weights for reception on the physical uplink channel.

13. The system according to claim 12, wherein said processing unit is configured to determine receive antenna weights for reception on a Physical Uplink Control Channel (PUCCH).

14. The system according to claim 9, wherein said communication units comprise network nodes, and said signals are transmitted on a downlink channel and wherein said processing unit is configured to determine transmit antenna weights for transmission on the downlink channel.

15. The system according to claim 9, wherein the processing unit is further configured to obtain an estimate of a soft symbol based on said determined antenna weights.

16. A computer program product stored in a non-transitory computer readable medium and comprising instructions embodied thereon, which when executed by at least one processor, cause the processor(s) to:
   extract, from a signal reception model for signals transmitted by at least two communication units, at least one of said communication units transmitting with punctured signals, a signal orthogonality loss quantity introduced by said punctured signals;
   calculate, based on the extracted signal orthogonality loss quantity, a covariance matrix quantifying said signal orthogonality loss quantity between signals transmitted by said at least two communication units; and
   determine, based on said covariance matrix, antenna weights for data symbols in said signals.

17. An apparatus for determining antenna weights for transmissions with punctured signals, the apparatus comprising:
   a reading module for reading, from a signal reception model for signals transmitted by at least two communication units, at least one of said communication units transmitting with punctured signals, a signal orthogonality loss quantity introduced by said punctured signals;
   a processing module for calculating, based on the signal orthogonality loss quantity, a covariance matrix quantifying said signal orthogonality loss quantity between signals transmitted by said at least two communication units; and
   a determining module for determining, based on said covariance matrix, the antenna weights for data symbols in said signals.

* * * * *